United States Patent
Gombert et al.

(10) Patent No.: US 7,302,350 B2
(45) Date of Patent: Nov. 27, 2007

(54) SELECTION OF SOFTWARE AND HARDWARE FUNCTIONS WITH A FORCE/TORQUE SENSOR

(75) Inventors: Bernd Gombert, Seefeld (DE); Bernhard Von Prittwitz, Seefeld (DE)

(73) Assignee: 3Dconnexion GmbH, Seefeld (DE)

( * ) Notice: Subject to any disclaimer, the term of this patent is extended or adjusted under 35 U.S.C. 154(b) by 348 days.

(21) Appl. No.: 10/433,991

(22) PCT Filed: Sep. 18, 2002

(86) PCT No.: PCT/EP02/10478

§ 371 (c)(1), (2), (4) Date: Nov. 13, 2003

(87) PCT Pub. No.: WO03/027943

PCT Pub. Date: Apr. 3, 2003

(65) Prior Publication Data

US 2004/0068336 A1 Apr. 8, 2004

(30) Foreign Application Priority Data

Sep. 21, 2001 (DE) ................................ 101 46 470

(51) Int. Cl.
*G01L 5/00* (2006.01)

(52) U.S. Cl. ............................. 702/41; 702/33; 702/42; 702/43; 702/44; 345/163; 345/164; 345/165; 345/166; 345/167; 345/173; 345/174; 345/175; 345/176; 345/177; 345/179; 345/180; 345/181; 345/182; 345/183; 345/184; 700/83; 700/84; 700/85

(58) Field of Classification Search .................. 702/41, 702/33, 42–44; 345/163–169, 173–177, 345/179–184, 156
See application file for complete search history.

(56) References Cited

U.S. PATENT DOCUMENTS

| | | | | |
|---|---|---|---|---|
| 5,116,180 A | * | 5/1992 | Fung et al. | 414/5 |
| 5,130,632 A | * | 7/1992 | Ezawa et al. | 318/568.11 |
| 5,181,181 A | * | 1/1993 | Glynn | 702/141 |
| 5,555,894 A | * | 9/1996 | Doyama et al. | 600/595 |

(Continued)

FOREIGN PATENT DOCUMENTS

DE 19937307 A1 2/2000

(Continued)

*Primary Examiner*—John Barlow
*Assistant Examiner*—Sujoy Kundu
(74) *Attorney, Agent, or Firm*—Scully, Scott, Murphy & Presser P.C.

(57) ABSTRACT

A force-moment sensor (1) is used as a switch, with which, depending on the introduction of forces and moments onto an operating part (5) of the force-moment sensor (1), software or hardware functions of a device (2, 2') to be controlled are triggered. For this purpose, the output signals of the force-moment sensor (1) are analysed by comparisons with threshold values. The selection of a device or a function thereof does not have to be chosen in advance, but takes place while introducing a force or a moment into the sensor. The introduced forces or moments in each degree of freedom of the sensor are analysed. The selection of the device or function coincides with the driving. The device can thus be simplified since no special facilities for selecting devices or functions must be provided. Additionally, the selection and driving are accelerated by this temporal coincidence.

14 Claims, 2 Drawing Sheets

U.S. PATENT DOCUMENTS

Figure 1:
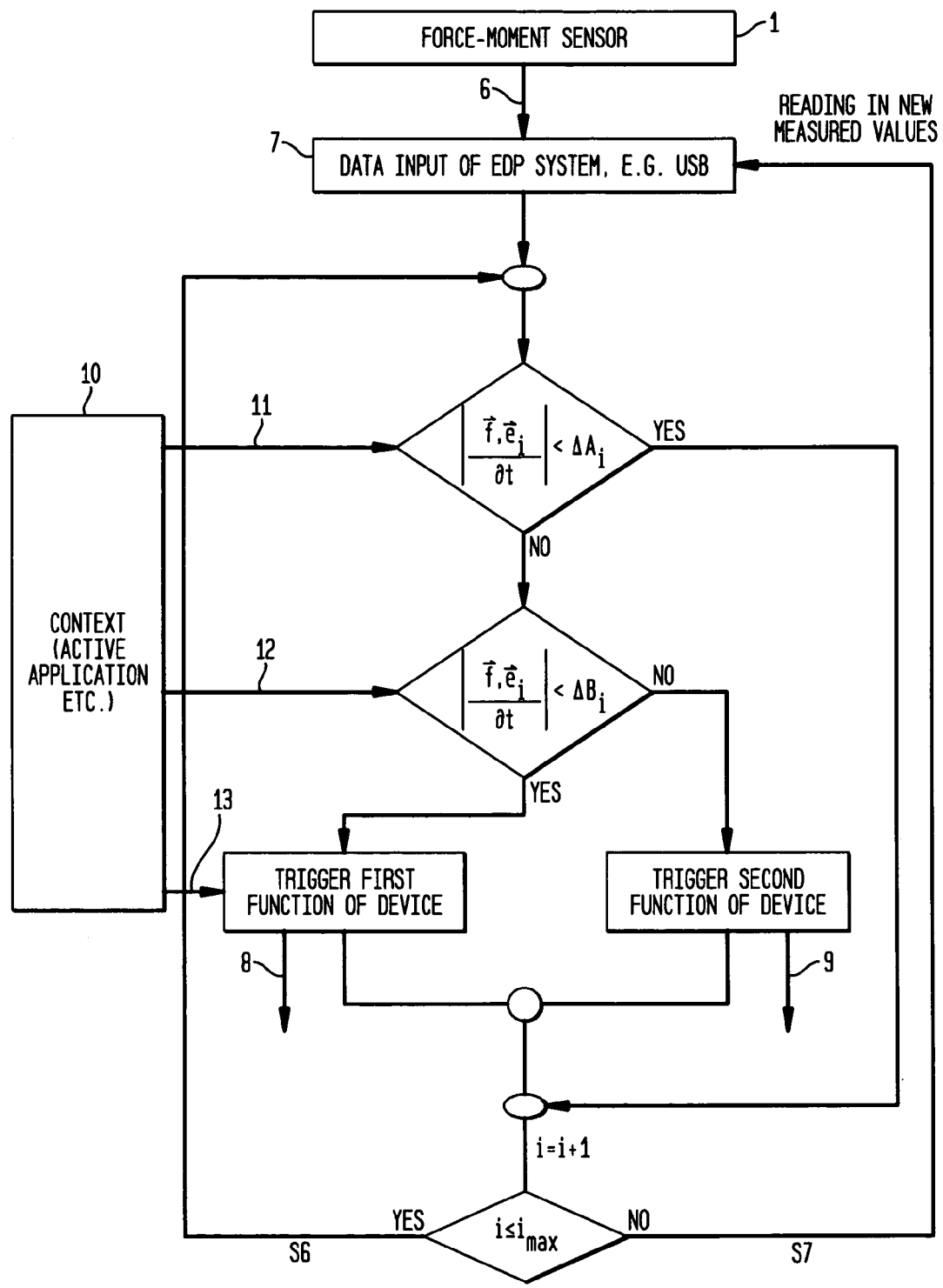

| | | |
|---|---|---|
| 5,729,249 A | 3/1998 | Yasutake |
| 5,898,424 A * | 4/1999 | Flannery ................... 345/163 |
| 5,936,612 A * | 8/1999 | Wang ........................ 345/164 |
| 6,425,865 B1 * | 7/2002 | Salcudean et al. .......... 600/437 |
| 6,429,846 B2 * | 8/2002 | Rosenberg et al. ......... 345/156 |
| 6,583,783 B1 * | 6/2003 | Dietrich et al. ............. 345/158 |
| 2001/0053942 A1 * | 12/2001 | Gombert et al. ............. 700/83 |
| 2002/0050984 A1 * | 5/2002 | Roberts ...................... 345/173 |
| 2002/0133310 A1 * | 9/2002 | Tamura ...................... 702/139 |
| 2002/0171625 A1 * | 11/2002 | Rothchild ................... 345/156 |
| 2004/0021643 A1 * | 2/2004 | Hoshino et al. ............. 345/173 |

FOREIGN PATENT DOCUMENTS

| | | |
|---|---|---|
| DE | 19952560 A1 | 5/2001 |
| EP | 0926581 A2 | 6/1999 |

\* cited by examiner

SELECTION OF SOFTWARE AND HARDWARE FUNCTIONS WITH A FORCE/TORQUE SENSOR

This invention concerns a method of controlling hardware and/or software functions of devices, a computer software program to execute such a method, and an input system to drive hardware and/or software functions of connected devices. This invention also concerns the selection of multiple devices using a force-moment sensor.

Force-moment sensors, which provide output signals concerning a force-moment vector which acts on them and thus output signals with respect to various degrees of freedom (e.g. three translatory and three rotary degrees of freedom) are known from the prior art. Further degrees of freedom can be provided by switches, rotating rollers, etc.

DE 199 52 560 A1 describes a method of adjusting and/or re-adjusting a seat of a motor vehicle using a multifunctional input device which is actuated manually, with a force-moment sensor. Such a force-moment sensor is shown in FIG. 6 of DE 199 52 560 A1. To this extent, therefore, reference is made to this figure and the associated description for DE 199 52 560 A1 concerning the technical details of such a sensor. In DE 199 52 560 A1, the input device has an operator interface on which a number of areas for input of at least one pressure pulse are provided. The input device has a device for analysing and recognising a pressure pulse which is captured by means of the force-moment sensor and converted into a force and moment vector pair. After such selection of, for instance, a motor vehicle seat or seat part to be driven, the selected device can then be driven linearly by means of an analog signal of the force-moment sensor. According to this prior art, therefore, the selection of a function and the subsequent driving are thus separated in two sequences which are separated from each other in time.

From DE 199 37 307 A1, using such a force-moment sensor to control the operator's controls of a real or virtual mixing or control panel, for instance to create and form novel colour, light and/or sound compositions, is known. In this way the intuitive spatial control in three translatory and three rotary degrees of freedom can advantageously be translated into an infinitely variable spatial mixing or control of a large number of optical and/or acoustic parameters. For control, pressure is exerted on the operator interface of the input device, and thus a pulse is generated. The pulse is captured using the force-moment sensor, and converted into a vector pair consisting of one force and one moment vector. If certain characteristic pulse conditions are fulfilled, for instance an object-specific control operation and/or a technical function can be triggered by switching into an activation state, or ended again by switching into a deactivation state.

According to the prior art, it is therefore generally provided, in the case of operation of a force-moment sensor or an input device which has such a sensor, that the step of selecting the device to be driven should be strictly separated technically and temporally from the actual driving.

In view of the prior art, it is therefore the object of this invention to improve driving of devices with multiple functions and/or of multiple devices.

The central thought of the invention is that the selection of a device or of one of multiple functions of a device does not have to be chosen in advance, but rather takes place in the course of the introduction of a force or a moment into the sensor. The introduced forces or moments in each degree of freedom of the sensor are thus analysed non-linearly, in the sense that the device and/or function is not inherently selected proportionally to the captured device activation. This corresponds to a switch which has at least three positions, i.e.

OFF/FUNCTION1/FUNCTION2 (function selection)

or

OFF/DEVICE1/DEVICE2 (device selection)

Therefore, since according to the invention the selection of the device or function coincides kinematically and temporally with the driving, on the one hand the device itself can be simplified, since no special facilities for selecting devices or functions must be provided. Additionally, the selection and driving are accelerated by this temporal coincidence.

In contrast, according to the teaching of DE 199 37 307 A1, when the input device is activated only one function can be triggered, since the only test is for whether one condition is fulfilled or not. This corresponds to a switch with the two positions

OFF/FUNCTION

Function selection is thus impossible according to DE 199 37 307 A1.

More precisely, the above-mentioned object is achieved by the features of the independent claims. The dependent claims extend the central thought of the invention in a specially advantageous way.

According to a first aspect of the invention, a method of controlling hardware and/or software functions of devices is provided. An output signal, which may for instance be analog, is generated by a force-moment sensor. The force-moment sensor can communicate with a device to be controlled. This communication can be wire-based or wireless. The output signal of the force-moment sensor is compared with several characteristics such as threshold values. These characteristics define ranges. For the case that according to the analysis the output signal is within a first range, a first function of the device is triggered. For the case that according to the analysis the output signal is within a second range, another function, which is different from the first function, is triggered.

The force-moment sensor can provide output signals with respect to multiple degrees of freedom of different kinds (maximum three translatory and three rotary degrees of freedom) for analysis. In this case, different but also the same characteristics (threshold values etc.) can be used for the comparison for the different degrees of freedom.

The output signal can be analysed depending on the context. In other words, according to this aspect of the invention the state in which the device is, is taken into account in the analysis. For instance, which application is currently active on the device (computer) can be taken into account in the driving of software functions. In the case of hardware functions, for instance the operating state can be taken into account.

The development of the output signal over time can be taken into account in the analysis. Alternatively or additionally, the current and in particular the absolute value of the output signal can be taken into account in the analysis.

According to another aspect of this invention, a method of controlling hardware and/or software functions of devices is provided. An output signal is generated by means of a force-moment sensor. The force-moment sensor can communicate with the device to be controlled. One of several functions of the device to be controlled is then triggered. The function to be triggered is selected depending on the output signal of the force-moment sensor in one degree of freedom.

According to another aspect of the invention, the method of selecting devices with hardware and/or software functions is provided. An output signal is generated by means of a force-moment sensor. One of several devices with which the force-moment sensor can communicate is then selected and driven. The selection is made depending on the output signal of the force-moment sensor with respect to one degree of freedom.

According to another aspect of this invention, a computer software program, which is implemented in such a way that it implements a method as described above if it runs on a computer device, is provided.

According to yet another aspect of this invention, an input system to drive hardware and/or software functions of connected devices is provided. An input device is used to capture forces and/or moments which act on an operating part of the input device. An output signal of the input device is fed to a processing unit on the device and/or input side. The processing unit compares the output signal with pre-defined characteristics (e.g. threshold values) and generates a driving signal, to trigger a first function of the device for the case that according to analysis of the output signal is in a first range, or another function of the device for the case that according to analysis of the output signal is in a second range. The ranges are delimited and defined by the pre-defined characteristics.

The processing unit can obtain output signals with respect to different degrees of freedom from the input device.

The processing unit can generate from driving signals depending on the context, to take account of the state in which the device to be driven currently is.

According to yet another aspect of this invention, an input system to drive hardware and/or software functions of connected devices is provided. An input device is used to capture forces and/or moments which act on an operating part of the input device. A processing unit on the device and/or input side receives an output signal from the input device and determines one of several functions of a device to be driven, depending on the output signal with respect to one degree of freedom of the input device.

According to yet another aspect of this invention, an input system to select and drive devices with hardware and/or software functions is provided. An input device captures forces and/or moments which act on an operating part of the input device. A processing unit on the device and/or input side receives an output signal from the input device and selects one of several devices, depending on the output signal of one degree of freedom of the input device.

Other features, advantages and properties of this invention can be seen in more detail from the following detailed description of embodiments and with the help of the figures of the attached drawings.

Figure 2:
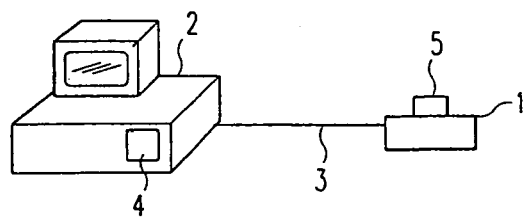
Figure 3:
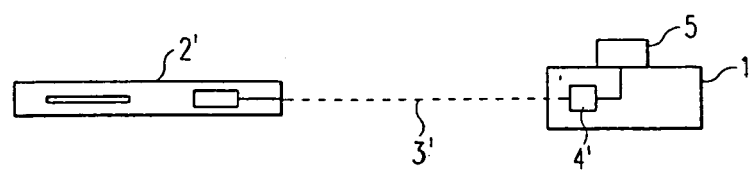
Figure 4:
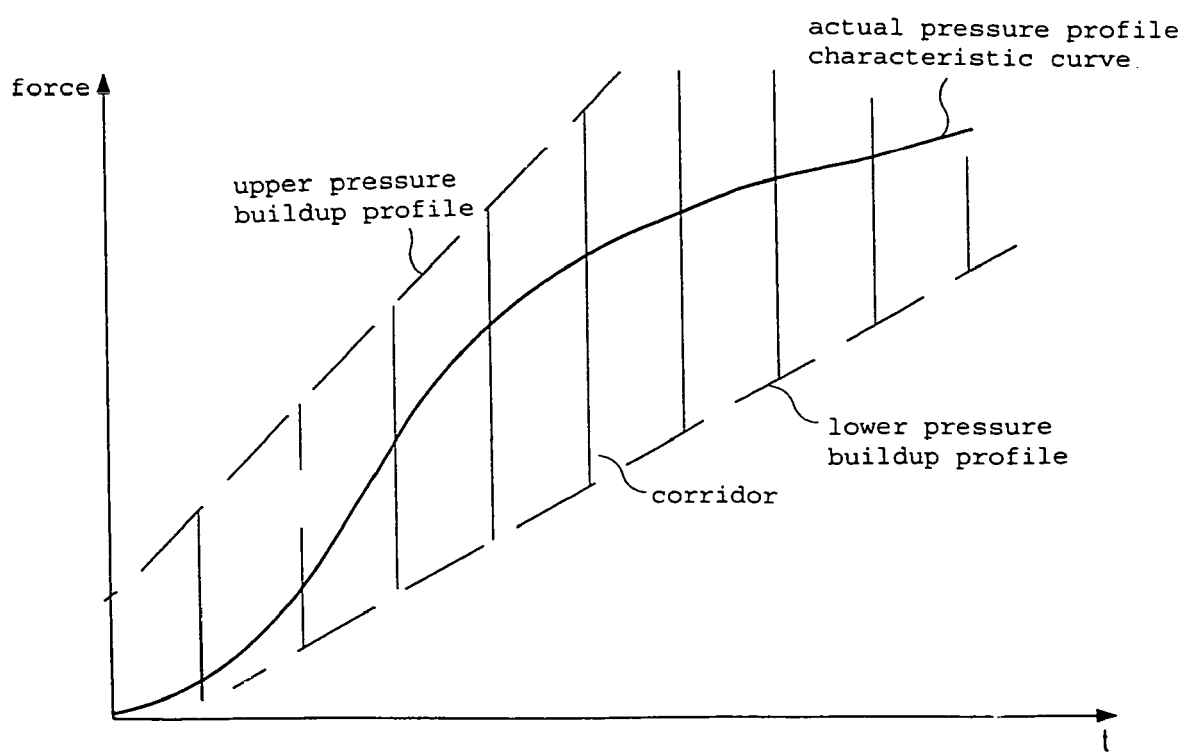

FIG. 1 shows the flow of processing according to the invention schematically, FIG. 2 shows an embodiment in which the input device controls software functions on a computer, FIG. 3 shows an embodiment in which an input device drives device functions, for instance of a CD player, without wires, and FIG. 4 shows how events can be triggered according to this invention on the basis of a force-time profile and predefined characteristics.

With reference to FIG. 1, the flow of force-controlled function triggering according to this invention will be explained first. A force-moment sensor 1 captures forces and moments which are introduced by a user in each degree of freedom of the force-moment sensor 1. The force-moment sensor 1 then outputs generally analog output signals 6, which reflect the introduced forces and moments. More precisely, multiple output signals 6 are output by the force-moment sensor 1, and reflect the force-moment vector $\vec{f}$, which is defined as follows:

$$\vec{f} = \begin{pmatrix} F_x \\ F_y \\ F_z \\ M_x \\ M_y \\ M_z \end{pmatrix}$$

$F_x$, $F_y$ and $F_z$ reflect the forces which are introduced in the three translatory degrees of freedom. $M_x$, $M_y$ and $M_z$ correspondingly reflect the moments which are introduced in the three rotary degrees of freedom.

These output signals 6 are then fed, for instance, to a USB data input 7 of the device which is to be controlled by means of the force-moment sensor 1. On the basis of the output signals 6 which have been fed from the force-moment sensor 1, the output signals 6 are then analysed, as will now be presented with reference to Steps S1 to S5.

In general, it is the case that in Steps S1 and S2 of the analysis, the output signals 6 are analysed with respect to each of the maximum of six degrees of freedom $F_x$, $F_y$, $F_z$, $M_x$, $M_y$ and $M_z$ of the force-moment sensor 1, and also compared with threshold values. Here, as will be explained in more detail below, both the absolute current value and the development of the force-moment sensor over time with respect to each degree of freedom can be assessed. In Step S1, for instance, it is possible to determine whether the force-moment vector $\vec{f}$, which is reflected by the output signal 6, fulfils the following equation with respect to the ith degree of freedom:

$$\left| \frac{\partial \langle \vec{f}, \vec{e}_i \rangle}{\partial t} \right| < \Delta A i \tag{1a}$$

This assessment therefore tests whether the absolute value of the change over time of the projection of the force-moment vector $\vec{f}$ onto the eigenvector $\vec{e}_i$ of the ith degree of freedom is less than a specified threshold value $\Delta A_i$ for the corresponding ith degree of freedom. i can go from 1 to a maximum of 6, because a maximum of three translatory and three rotary degrees of freedom is possible.

Alternatively to the assessment of the development over time according to Equation 1a, the absolute value of the force-moment vector with respect to a specified degree of freedom can be assessed, as follows:

$$|\langle \vec{f}, \vec{e}_i \rangle| < \Delta A_i \tag{1b}$$

According to this assessment, the absolute value (amount) of the projection of the force-moment vector $\vec{f}$ onto the eigenvector $\vec{e}_i$ of the ith degree of freedom is compared with the appropriate threshold value $\Delta A_i$ for this ith degree of freedom.

It should be noted that the absolute value and development over time are only examples of time-dependent characteristics with which the force-moment vector is compared.

If the result of the decision according to Equation (1a) or (1b) is negative, the development of the force-moment vector $\vec{f}$ over time, or the absolute value of the force-moment vector $\vec{f}$ with respect to a degree of freedom i, is so small that no selection or control event is triggered. By comparison with a switch, this means that the switch is so to speak in the 0 position.

However, if Equation (1a) or (1b) is not fulfilled according to the comparison in Step S1, i.e. either the development over time or the absolute value of the force-moment vector $\vec{f}$ in the appropriate degree of freedom exceeds the first threshold value $\Delta A_i$ of the ith degree of freedom, Step S2 tests whether the development over time $$\left| \frac{\partial \langle \vec{f}, \vec{e}_i \rangle}{\partial t} \right| < \Delta B_i \quad (2a)$$

or the absolute value of the force-moment vector $\vec{f}$ with respect to the ith degree of freedom $$|<\vec{f}, \vec{e}_i>| < \Delta B_i \quad (2b)$$

is less or greater than a second threshold value $\Delta B_i$, where $$\Delta B_{i > \Delta Ai}.$$

If the comparison in Step S2 has a positive result, i.e. the development over time or the absolute value of the force-moment vector $\vec{f}$ with respect to the ith degree of freedom is between the two threshold values $\Delta A_i$ and $\Delta B_i$, in Step S3 a driving signal 8 is output, and selects a first function (Function 1) of a connected device. This can, for instance, be a hardware function, so that for instance in the case of a CD player the next track is driven. In the case of a software function, for instance in the case of a word processing program, the page down function can be triggered.

It can be advantageous if a threshold value coincides with a final position (limit stop) of the force-moment sensor 1 with respect to one direction of motion. In this case, therefore, an event is triggered if the force-moment sensor 1 is pushed in this direction of motion (each degree of freedom has two directions of motion) as far as the limit stop. This stopping advantageously communicates haptic feedback information to the user, and this information simplifies targeted driving of the event which is linked to the limit stop.

Additionally, the threshold values can generally be communicated to the user haptically, by, for instance, a haptic feedback signal being communicated to the user when the threshold value is reached. This can be, for instance, an increased resistance ("ripple").

If the result of the test in Step S2 is that Equation 2a or 2b is not fulfilled, and thus the development over time or absolute value of the force-moment vector in the appropriate degree of freedom e exceeds not only the threshold value $\Delta A_i$ but also the higher threshold value $\Delta B_i$, another driving signal 9 is output. Therefore, whereas the first driving signal 8 corresponds to a second position of a switch, this other driving signal 9 (or any driving signal which is provided correspondingly in addition) represents a third position (or further position) of the "switch". This other driving signal 9 can trigger a software or hardware function which differs from those which can be triggered by the first driving signal 8. In the case of a hardware function, for instance in the case of a CD player, this can correspond to "fast forward". In the case of a software application, for instance word processing, this can be equivalent to a "line down" driving command.

In a further Step S5, processing returns (Step S6) to Step S1 until all degrees of freedom of the force-moment vector $\vec{f}$, which is reflected by the output signal 6, have been analysed. In Step S5, therefore, there is a test for whether the following equation is fulfilled:

$$i \leq i_{max}.$$

If this equation, according to the analysis in Step S5, does not lead to a positive result, and thus all degrees of freedom of a set of measured values have been analysed, processing returns in a Step S7 to reading in a set of new measured values, i.e. a set of output signals 6 which reflect a new, complete force-moment vector $\vec{f}$. Otherwise, i is incremented by one and the next degree of freedom is analysed.

According to another aspect of this invention, the analysis in Steps S1, S2, S3 and S4 is context-dependent. For this purpose, information about the context 10 of the device to be driven is fed to the processing. The context can be the operating state of the device to be driven, information concerning a software application which is currently active on the device, etc. Depending on the information concerning the context 10, corresponding information 11, 12 can be put into the threshold values $\Delta A_i$ and $\Delta B_i$ in Steps S1 and S2 respectively. Additionally, by feeding in appropriate information 13, the type of the driving signals 8, 9 can be changed depending on the context information 10.

It should be noted that the term "context" must be understood very broadly according to this invention. "Context" must be understood to include, for instance, external parameters (temperature, etc.) which are captured to change, for instance, parameters of the force-moment sensor 1 (sensitivity, amplification, coupling, etc.) depending on environmental effects.

A further example of context dependency is that past events can influence how which event is selected and driven. Thus, through a past event, the flow goes into a state which so to speak documents the past. Correspondingly, a memory in which the current state of the flow is held can be provided. Then, when a subsequent event is triggered, it is possible, on the basis of retrieving the state, to take account of which events have already been driven by the user in the past.

With reference to FIGS. 2 and 3, two specific embodiments of this invention will now be explained.

In FIG. 2, a force-moment sensor 1 is provided with an operating part 5. The user can introduce forces and moments onto the operating part 5. In the embodiment of FIG. 2, the force-moment sensor 1, like a "3D mouse", is permanently connected to a computer 2 by a line 3. The computer 2 therefore represents the device to be controlled in this case. In this embodiment, a processor 4 in the computer 2 can analyse the output signals of the force-moment sensor 1, and correspondingly, as explained in FIG. 1, control software and/or hardware functions of the computer 2.

According to the embodiment of FIG. 3, a processor 4' is provided in the force-moment sensor 1 with the operating part 5 itself, and an force-moment sensor 1 internally, so that driving signals are already output by the force-moment sensor 1. In the example of FIG. 3, these are transmitted without wires (radio interface 3'), for instance using the Bluetooth standard or by infra-red, to a CD player 2'. In this case, therefore, the force-moment sensor 1 has the function of a remote control, with which by corresponding introduction of a force or a moment onto the operating part 5 in one degree of freedom, various functions of the CD player 2' can be triggered as by a switch.

With reference to FIG. 4, how the force-moment sensor 1 generates a force-time profile depending on use will now be explained. If this force-time profile fulfils specified characteristics, this represents an event, which triggers predefined functions, at a specified time. Threshold values are thus only special cases of such characteristics of the force-time profile.

As can be seen in FIG. 4, a characteristic can also be that the force-time profile runs in a predefined corridor, which is delimited by a lower and upper pressure buildup profile. These pressure buildup profiles are only an example of the development of the force course, and thus of the driving signal, over time being balanced with characteristics, to trigger functions depending on them. A pressure buildup corridor as shown in FIG. 4 can be implemented technically by, for instance, band pass filtering of the force course in frequency space, i.e. after a Fourier transform. The upper and lower limits of the corridor in time space are then reflected by the lower and upper limits of band pass filtering in frequency space.

The invention thus creates several advantages. Selection of a device or of one of several functions of a device does not have to be chosen in advance, but rather takes place in the course of the introduction of a force or a moment into the sensor. The introduced forces or moments in each degree of freedom of the sensor are then analysed. According to the invention, the selection of the device or function coincides with the driving. In this way, on the one hand the device itself can be simplified, since no special facilities must be provided for selecting devices or functions. Additionally, the selection and driving are accelerated by this temporal coincidence.

Below, examples of possible applications of this invention will be listed briefly:

Driving electronic or electrical devices such as a CD player has already been mentioned.

The possibility of driving an application program which runs on a computer device with which the input device communicates has also been mentioned. he functions which are driven by the input device can be, among other things, changing discrete hierarchical steps of a directory tree structure or of subdirectories when predefined threshold values of the input device are reached. Thus no continuous (analog) pixel scaling with adjustment of font sizes etc. takes place, but discrete opening and closing events of further levels or detail stages (e.g. in the case of use in connection with a CAD program), depending on the manipulation of the input device.

The invention claimed is:

1. Method of controlling hardware and/or software functions of devices, having the following steps:
    generation of an output signal by means of a force-moment sensor, which communicates with the device to be controlled, and can be manipulated manually in multiple degrees of freedom,
    comparison of the output signal with at least one specified characteristic defining ranges,
    triggering a first function of the device for the case that according to analysis, a value of the output signal with respect to one degree of freedom of the force-moment sensor is in a first range, triggering a further function for the case that according to analysis, the value of the output signal with respect to the one degree of freedom is in a second range, and triggering no function for the case that according to analysis, the value of the output signal with respect to the one degree of freedom is not in the first range or the second range.

2. Method according to claim 1, wherein the force-moment sensor provides output signals with respect to different degrees of freedom for analysis.

3. Method according to claim 1, wherein the analysis of the output signal is context-dependent, to take account of the state in which the device currently is.

4. Method according to claim 3, wherein a driving of software functions takes account of which application is currently active on the device.

5. Method according to claim 3, wherein external parameters are taken into account as context in the analysis of the output signal.

6. Method of controlling hardware and/or software functions of devices having the following steps:
    generation of an output signal by means of a force-moment sensor, which communicates with the device to be controlled, and can be manipulated manually in multiple degrees of freedom,
    comparison of the output signal with at least one specified characteristic defining ranges, triggering a first function of the device for the case that according to analysis, a value of the output signal with respect to one device of freedom of the force-moment sensor is in a first range, triggering a further function for the case that according to analysis, the value of the output signal with respect to the one degree of freedom is in a second range, and triggering no function for the case that according to analysis, the value of the output signal with respect to the one degree of freedom is not in the first range or the second range,
    wherein the analysis of the output signal is context-dependent, to take account of the state in which the device currently is and wherein past events are taken into account as state context in the analysis of the output signal.

7. Method according to claim 1 wherein the development of the output signal is taken into account in the analysis.

8. Method according to one of claims 1 wherein the current value of the output signal is taken into account in the analysis.

9. Method of controlling hardware and/or software functions of devices, having the following steps:
    generation of an output signal by means of a force-moment sensor which communicates with the device to be controlled, and can be manipulated manually in multiple degrees of freedom,
    comparison of the output signal with at least one specified characteristic defining ranges, triggering a first function of the device for the case that according to analysis, a value of the output signal with respect to one device of freedom of the force-moment sensor is in a first range, triggering a further function for the case that according to analysis, the value of the output signal with respect to the one degree of freedom is in a second range, and triggering no function for the case that according to analysis, the value of the output signal with respect to the one degree of freedom is not in the first range or the second range,
    wherein a threshold value coincides with a final position of the force-moment sensor in one direction of motion.

10. Computer readable medium having computer program code, implementing a method according to claim 1 when executed by a processor.

11. Input system for driving hardware and/or software functions of connected devices, having
- an input device to capture forces and/or moments which act on an operating part of the input device, and
- a device and/or input side processing unit, to which an output signal of the input device can be fed, and which is designed to compare the output signal with predefined characteristics which define ranges, and to generate a driving signal to trigger a first function of the device for the case that according to analysis of the output signal with respect to one degree of freedom of a force-moment sensor is in a first range, and/or another function of the device for the case that according to analysis the value of the output signal with respect to the one degree of freedom of the force-moment sensor is in a second range,
- wherein the input side processing unit receives output signals concerning different degrees of freedom from the input device, and
- wherein the input side processing unit generates the driving signal depending on context, to take account of the state in which the device currently is.

12. Input system according to claims 11 wherein external parameters are taken into account as context in the analysis of the output signal.

13. Input system for driving hardware and/or software functions of connected devices, having
- an input device to capture forces and/or moments which act on an operating part of the input device, and
- a device and/or input side processing unit, to which an output signal of the input device can be fed, and which is designed to compare the output signal with redefined characteristics which define ranges, and to generate a driving signal to trigger a first function of the device for the case that according to analysis of the output signal with respect to one degree of freedom of a force-moment sensor is in a first range, and/or another function of the device for the case that according to analysis the value of the output signal with respect to the one degree of freedom of the force-moment sensor is in a second range,
- wherein the input side processing unit receives output signals concerning different degrees of freedom from the input device,
- wherein the input side processing unit generates the driving signal depending on context, to take account of the state in which the device currently is, and
- wherein past events are taken into account as state context in the analysis of the output signal.

14. Input system for driving hardware and/or software functions of connected devices, having
- an input device to capture forces and/or moments which act on an operating part of the input device, and
- a device and/or input side processing unit, to which an output signal of the input device can be fed, and which is designed to compare the output signal with predefined characteristics which define ranges, and to generate a driving signal to trigger a first function of the device for the case that according to analysis of the output signal with respect to one degree of freedom of a force-moment sensor is in a first range, and/or another function of the device for the case that according to analysis the value of the output signal with respect to the one degree of freedom of the force-moment sensor is in a second range,
- wherein the input side processing unit receives output signals concerning different degrees of freedom from the input device,
- wherein the input side processing unit generates the driving signal depending on context, to take account of the state in which the device currently is, and
- wherein a threshold value coincides with a final position of the force-moment sensor in one direction of motion.

* * * * *